United States Patent
Ogawa et al.

(10) Patent No.: US 7,919,889 B2
(45) Date of Patent: Apr. 5, 2011

(54) OSCILLATOR DEVICE, OPTICAL DEFLECTOR AND OPTICAL INSTRUMENT USING THE SAME

(75) Inventors: Toshiyuki Ogawa, Tokyo (JP); Takashi Ushijima, Nagoya (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 12/186,937

(22) Filed: Aug. 6, 2008

(65) Prior Publication Data

US 2009/0039716 A1   Feb. 12, 2009

(30) Foreign Application Priority Data

Aug. 7, 2007  (JP) ................................ 2007-204850

(51) Int. Cl.
*H02K 33/00* (2006.01)
*H02K 35/00* (2006.01)

(52) U.S. Cl. .................... 310/36; 359/223.1; 359/224.1; 359/224.2

(58) Field of Classification Search .................... 310/36; 359/223.1, 224.1, 224.2; *H02K 33/00, 35/00*
See application file for complete search history.

(56) References Cited

U.S. PATENT DOCUMENTS

| | | | |
|---|---|---|---|
| 5,280,377 A | | 1/1994 | Chandler et al. |
| 5,469,291 A * | | 11/1995 | Plesko ........................ 359/224.1 |
| 6,924,915 B2 * | | 8/2005 | Hirose et al. ............... 359/199.3 |
| 6,956,684 B2 * | | 10/2005 | Orcutt ......................... 359/199.1 |
| 6,965,177 B2 * | | 11/2005 | Turner et al. ..................... 310/38 |
| 6,989,614 B2 * | | 1/2006 | Mizoguchi et al. ............. 310/36 |
| 7,148,591 B2 * | | 12/2006 | Mizoguchi et al. ............. 310/36 |
| 7,324,252 B2 | | 1/2008 | Yee et al. |
| 2003/0137711 A1 * | | 7/2003 | Yagi et al. ..................... 359/224 |
| 2005/0078346 A1 * | | 4/2005 | Turner et al. .................. 359/225 |
| 2005/0225821 A1 * | | 10/2005 | Orcutt ........................... 359/224 |
| 2006/0171728 A1 * | | 8/2006 | Ichimura et al. ................. 399/48 |
| 2006/0267593 A1 * | | 11/2006 | Ichimura et al. ............... 324/452 |
| 2009/0039716 A1 * | | 2/2009 | Ogawa et al. ................... 310/36 |

FOREIGN PATENT DOCUMENTS

| | | |
|---|---|---|
| JP | 5-264917 | 10/1993 |
| JP | 6-82711 | 3/1994 |
| JP | 2006-119420 | 5/2006 |
| JP | 2006-201783 | 8/2006 |

* cited by examiner

*Primary Examiner* — Quyen Leung
*Assistant Examiner* — John K Kim
(74) *Attorney, Agent, or Firm* — Fitzpatrick, Cella, Harper & Scinto

(57) ABSTRACT

An oscillator device includes an oscillator, a resilient support member configured to support the oscillator for oscillatory motion about an oscillation central axis, a magnetic member provided on the oscillator, and a magnetic-field generating member disposed opposed to the oscillator, wherein the oscillator has a through-hole extending through the oscillator from its top surface to its bottom surface, and wherein the magnetic member is provided in the through-hole.

16 Claims, 12 Drawing Sheets

OSCILLATOR DEVICE, OPTICAL DEFLECTOR AND OPTICAL INSTRUMENT USING THE SAME

FIELD OF THE INVENTION AND RELATED ART

This invention relates to an oscillator device having an oscillator supported for oscillation around an oscillation central axis, an optical deflector, and an optical instrument such as an image forming apparatus using the same.

Image forming apparatuses such as a copying machine or a laser beam printer, optical instruments such as a bar code reader or the like, and optical instruments such as a visual display unit in which a laser beam is scanned to project an image, use an optical scanner (optical deflector).

Generally, for optical scanners which mechanically perform optical scanning, a polygon mirror comprising a rotary polygonal mirror and a galvano mirror comprising an oscillation type reflecting mirror are known. Particularly, in the galvano mirror type scanners, resonance type optical scanners based on a silicon substrate have been developed through micromechanics techniques. This will enable reduction in size, weight and cost, and image forming apparatuses using such a resonance type optical scanner have been proposed.

A prior art example of optical deflector satisfying these is the one disclosed in Japanese Laid-Open Patent Application No. 06-82711. FIG. 10 is a perspective view which shows an optical deflector of this example. The optical deflector comprises a magnetism generating member 2 having an electric coil 2a, and a planner scanning mirror 1. The scanning mirror 1 is driven while being angularly displaced in response to the magnetism of the magnetism generating member 2 caused by energizing the electric coil 2a, so that the light reflected by the mirror surface portion 1b is scanned. The scanning mirror 1 is supported at its opposite ends by a supporting member 1d, for angular displacement about the driving axis 1e that connects the opposite end portions. Furthermore, one side of the scanning mirror 1 is defined by the mirror surface member 1b, while the other side is defined by a thin film-shaped permanent magnet 1c being polarized by different poles at both sides of the driving axis 1e. In the magnetism generating member 2, a direction orthogonal to the driving axis 1e of the scanning mirror 1 is made coincident with the winding axis of the electric coil 2a. Additionally, it is provided at the other side of the scanning mirror 1, with a predetermined distance maintained therebetween. Thus, the scanning mirror 1 can be driven alone in the light-weight state, having only the thin-film permanent magnet 1c provided on the other side. Therefore, even if the scanning mirror 1 is made large in size, it can be easily driven by a comparatively small driving force.

However, the optical deflector described above has the following inconveniences. That is, if the center of the torsional torque generated in the permanent magnet 1c deviates from the driving axis 1e defined by the supporting member 1d, transverse vibration may occur in the scanning mirror 1. It this occurs, stable torsional oscillation about the driving shaft 1e is not attained, and the operational stability is disturbed.

SUMMARY OF THE INVENTION

The present invention in an aspect thereof provides an oscillator device, comprising: an oscillator; a resilient support member configured to support said oscillator for oscillatory motion about an oscillation central axis; a magnetic member provided on said oscillator; and a magnetic-field generating member disposed opposed to said oscillator; wherein said oscillator has a through-hole extending through said oscillator from its top surface to its bottom surface, and wherein said magnetic member is provided in said through-hole.

In one preferred form of this aspect of the present invention, the magnetic member has a gravity center which is placed on the oscillation central axis of said oscillator.

The through-hole may open outside, at one location on a side surface of said oscillator.

The through-hole may have a recess formed in its side wall, wherein the recess may be symmetric with respect to a plane which contains the oscillation central axis and which is parallel to the surface of said oscillator, and wherein said magnetic member may be provided at the recess.

The through-hole may extend in a direction intersecting with the oscillation central axis.

The oscillator may comprise a plurality of said oscillators and a plurality of said torsion springs, and said oscillators and said torsion springs may be disposed on a straight line extending along the oscillation central axis.

At least one of said oscillators may be formed without said through-hole and said magnetic member.

The magnetic member may have a cylindrical shape.

The magnetic member may have a thickness larger than a thickness of said oscillator.

The oscillator may be made of silicon monocrystal.

The side wall of said through-hole may be constituted by a (111)-equivalent surface of the crystal surface of the silicon monocrystal.

The lengths of openings formed at the top surface and the bottom surface of said oscillator, respectively, in a direction parallel to the oscillation central axis, may be equal to each other, and, when the length of the two openings is denoted by d and the thickness of said oscillator is denoted by t, an inequality d*tan 54.7°>t may be satisfied.

One of lengths of openings formed at the top surface and the bottom surface of said oscillator, respectively, in a direction parallel to the oscillation central axis may be shorter than the other length.

The magnetic member may be comprised of a permanent magnet, and said magnetic-field generating member may be comprised of an electromagnetic coil.

In accordance with another aspect of the present invention, there is provided an optical deflector, comprising: an oscillator device as recited above; and a light reflecting member provided on one oscillator.

In accordance with a further aspect of the present invention, there is provided an optical instrument, comprising: a light source; an optical deflector as recited above; and a target member on which light is to be incident; wherein said optical deflector is configured to deflect light from said light source and to project at least a portion of the light onto said target member.

In accordance with a yet further aspect of the present invention, there is provided a method of manufacturing an oscillator device recited above, the improvement residing in that a side wall of the through-hole is formed based on an anisotropic etching process.

In accordance with the present invention, since the magnetic member is provided within a through-hole formed in the oscillator, even if the magnetic member is made large, the gravity center of the oscillator deviates little from the oscillation central axis. Furthermore, the center of the torque produced in the magnetic member deviates little from the oscillation central axis. Therefore, the oscillator can oscillate stably about the oscillation central axis.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2A and FIG. 2B are diagrams for explaining transverse vibration of the oscillator when the gravity center of the magnet and the oscillation central axis are not aligned each other, wherein FIG. 2A is a schematic diagram when the gravity center of the magnet and the oscillation central axis are aligned each other, and FIG. 2B is a schematic diagram when the gravity center of the magnet and the oscillation central axis are not aligned each other.

DESCRIPTION OF THE PREFERRED EMBODIMENTS

Preferred embodiments of an oscillator device, an optical deflector and an optical instrument using the same, according to the present invention, will now be described with reference to the attached drawings.

First Embodiment

Figure 1A:
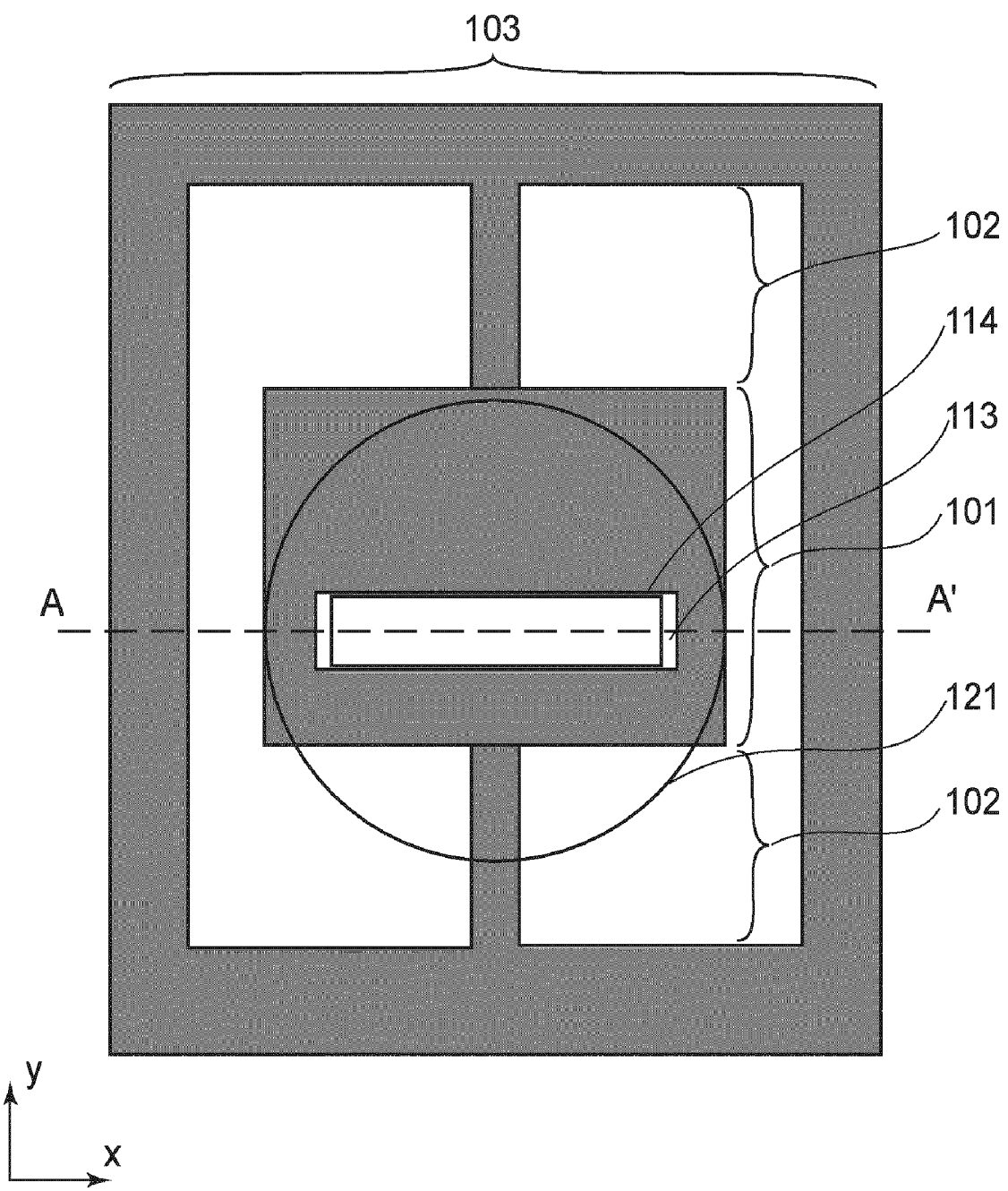
FIG. 1A is a top plan view for explaining a first embodiment of an optical deflector using an oscillator device according to the present invention.
Figure 1B:
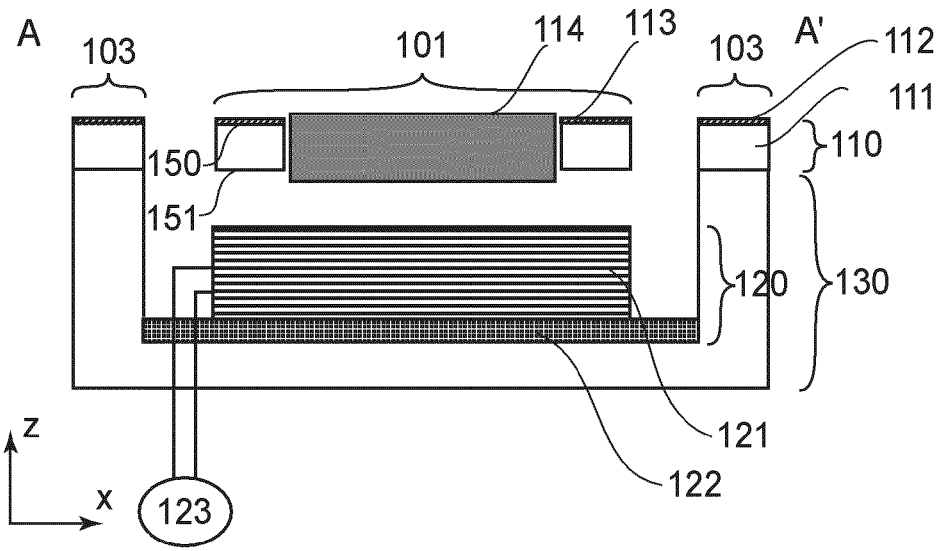
FIG. 1B is a sectional view for explaining the first embodiment of the present invention.

Referring to several drawings, the structure of an optical deflector 100 according to a first embodiment, using an oscillator device of the present invention, will be explained. FIG. 1A is a top plan view thereof, and FIG. 1B is a sectional view taken along a line A-A' in FIG. 1A. As shown in these drawings, the optical deflector 100 comprises a structure in which a tip portion 110 made through MEMS technique and an electromagnetic coil member 120, constituting a driving mechanism, are installed on a jig 130. With regard to the size of the structure, for example, it is about 5 mm in length, about 5 mm in width and around 3 mm in height.

The tip portion 110 will be explained in detail with reference to FIG. 1A and FIG. 1B. In these drawings, for better understanding, the size and the relative ratio are illustrated with exaggeration or modification. The tip portion 110 is comprised of an oscillator 101 supported for oscillation, a torsion spring 102 which is a resilient support member, and a supporting member 103 which is a support. The oscillator 101 is supported by the supporting member 103 through the torsion spring 102, and the supporting member 103 is fixed to the jig 130.

The oscillator 101, torsion spring 102 and supporting member 103 are formed integrally from a substrate 111. The substrate 111 is made of monocrystal silicon, for example. Since the monocrystal silicon has superiority in mechanical characteristics such as large Young's modulus, small specific gravity and little plastic deformation, the oscillator 101 can have a large resonance frequency.

The substrate 101 is provided with a reflection film (light reflecting member) 112 formed on the surface thereof. The reflection film 112 is made of aluminum, for example. The reflection film on the oscillator 101 functions as an optical deflection element of the optical deflector 100. Furthermore, the oscillator 101 is formed with a through-hole 113 in which a permanent magnet 114 is placed. The through-hole 113 is formed to extend through the oscillator, from its top surface 150 to its bottom surface 151 (namely, in the z-axis direction). In order to assure a large area of the reflection film 112 on the oscillator 101, the through-hole 113 is formed at a position which deviated from the central portion of the oscillator 101, as shown in FIG. 1A. The permanent magnet 114 which is a magnetic member is made of a material based on polarizing a hard magnetic material such as samarium cobalt or neodymium iron boron, for example. The permanent magnet 114 has a cylindrical shape, and the through-hole 113 can be easily disposed therein.

Figure 1C:
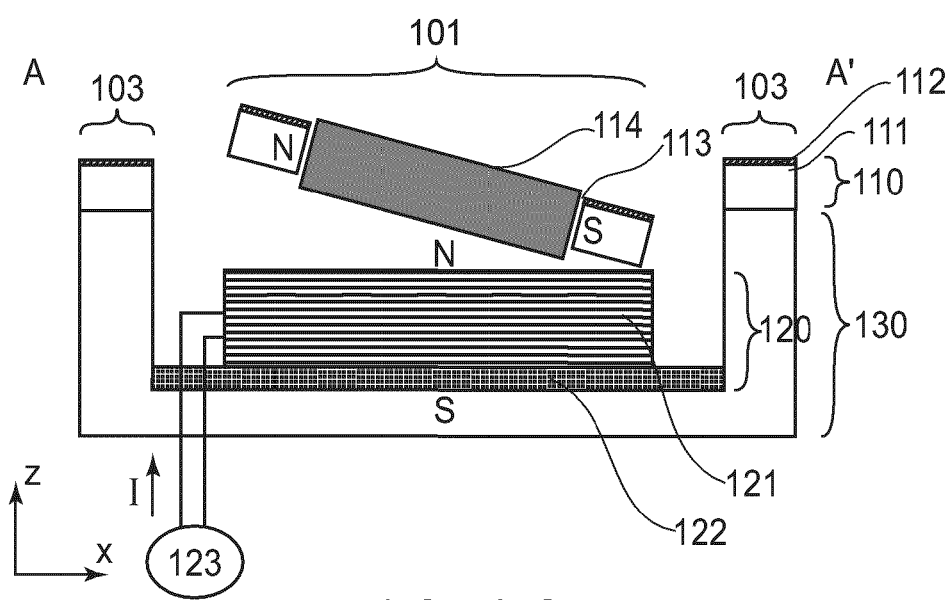
FIG. 1C is a sectional view for explaining an oscillation method.
Figure 1D:
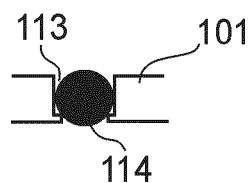
FIG. 1D is a sectional view of a portion where a magnetic member is provided.

In this embodiment, the thickness of the substrate 111 is around 300 microns, whereas the diameter (thickness) of the permanent magnet 114 of cylindrical shape is around 400 to 500 microns. Namely, the latter is made larger than the former. Furthermore, the length of the through-hole 113 (i.e., the length of the through-hole 113 in the lateral direction as viewed in the sheet of FIG. 1B, namely, the length in the x-axis direction) is about the same level as the length of the permanent magnet 114 (i.e., the length in the lateral direction as viewed in the sheet of FIG. 1B). Furthermore, the width of one of the openings at the top and bottom surfaces of the through-hole (i.e., length in the direction parallel to the oscillation central axis of the through-hole 113 of FIG. 1, namely, the length in the y-axis direction) is at the same level as a diameter (width) of the permanent magnet 114. On the other hand, the width of the other opening of the openings at the top and bottom surfaces of the through-hole is made smaller than the diameter of the permanent magnet 114. Thus, the permanent magnet 114 can be easily inserted into the through-hole 113 from one opening, and it can be positioned there. When it is done, as shown in FIG. 1D, a portion of the permanent magnet 114 is placed out of the through-hole 113. With this arrangement, when the permanent magnet 114 is disposed, the alignment can be done very easily and accurately. With regard to the polarity of the permanent magnet 114, as shown in FIG. 1C, an N pole and an S pole are defined across the oscillation central axis as defined by the torsion spring 102 (an axis orthogonal to a line A-A' in FIG. 1A). As regards the polarity, however, the N pole and S pole illustrated may be reversed.

The cross-sectional shape of the permanent magnet as well as the cross-sectional shape of the through-hole are not limited to that mentioned above (namely, circular shape and stepwise shape). The cross-sectional shape of the permanent magnet may be rectangular, polygonal or elliptical. The cross-sectional shape of the through-hole may be a tapered shape as in a second embodiment to be described later, other than the stepwise shape. The positioning method of the permanent magnet can have a wide variety based on the combination of the cross-section of the permanent magnet and the cross-section of the through-hole. For example, there is a method in which the side surface of the permanent magnet is abutted against the side wall of the through-hole. Furthermore, the positioning in the lengthwise direction may have a wide variety. For example, there is a method in which the end face of the permanent magnet is abutted against the end face of the through-hole. Furthermore, the number of through-holes may be two or more, provided that the gravity center of a permanent magnet mounted inside each through-hole is aligned with the oscillation central axis.

The electromagnetic coil member 120 will be explained furthermore. In this embodiment, the electromagnetic coil member 120 is comprised of an electromagnetic coil 121 and an electromagnetic coil substrate 122. The electromagnetic coil 121 has its electric wirings wounded in a circular shape along the X-Y plane. In response to an electric power supplied from a power source 123, an N pole or S pole appears at the top surface or the bottom surface of the electromagnetic coil 121, depending on the direction of the electric current. The electric wirings of the electromagnetic coil 121 are made of a low-resistance metal such as copper or aluminum, and the number of turns (windings) is from several ten times to several hundred times. With regard to the size of the electromagnetic coil 124, the diameter is d=3 mm and the height is t=2 mm, for example. The magnetic coil substrate 122 is made of a ferromagnetic material such as iron or Permalloy (registered trademark). It has a function for supporting the electromagnetic coil 121 and a function for intercepting the magnetic field produced from the electromagnetic coil 121 at the position of the substrate 122, thereby to concentrate the magnetic field upwardly.

Next, the oscillation method of the oscillator 101 will be explained. FIG. 1C shows the state in which an electric current I flows into the electromagnetic coil 121 and the N pole appears at the top surface of the electromagnetic coil 121. The magnetic field H produced there is proportional to the product of the current I flowing through the electromagnetic coil 121 with the number of turns N of the electromagnetic coil 121. The magnetic field H acts on the magnetic pole of the permanent magnet 114, so that the torsion spring 102 deforms around the oscillation central axis and thus the oscillator 101 is displaced. By using an alternating current for the current I, the oscillator 101 can be displaced periodically. Furthermore, if the frequency of the alternating current and the resonance frequency of the oscillator 101 are made approximately equal to each other, oscillatory displacement of the oscillator 101 can be accomplished by low power consumption.

It should be noted here that the permanent magnet may be replaced by a soft magnetic material. However, in that occasion, only an attraction force acts between the electromagnetic coil and the soft magnetic material. Therefore, it is necessary to dispose the electromagnetic coil and the soft magnetic material to meet this. Even in a case where a soft magnetic material is used, the driving can be accomplished by a structure having a single electromagnetic coil such as shown in FIG. 1C. Another possible example is that a couple of electromagnetic coils are provided at positions opposed to a portion of the soft magnetic material at symmetrical positions across the oscillation central axis, and a controlled electric current is alternately applied to the two electromagnetic coils, to cause the oscillator to produce oscillatory motion about the oscillation central axis. In this way, the oscillator 101 can be driven efficiently. In that case, for example, two through-holes may be formed in portions of the oscillator 101 which are symmetric with respect to the oscillation central axis, and soft magnetic materials may be provided in these through-holes, with the gravity centers of them being placed on the oscillation central axis. Furthermore, the magnetic-field generating means may comprise, other than the electromagnetic coil, a permanent magnet which is rotationally driven to modulate the magnetic field acting on the magnetic member, a combination of a magnetic shielding shutter and a permanent magnet similarly driven to modulate the magnetic field.

Figure 2A:
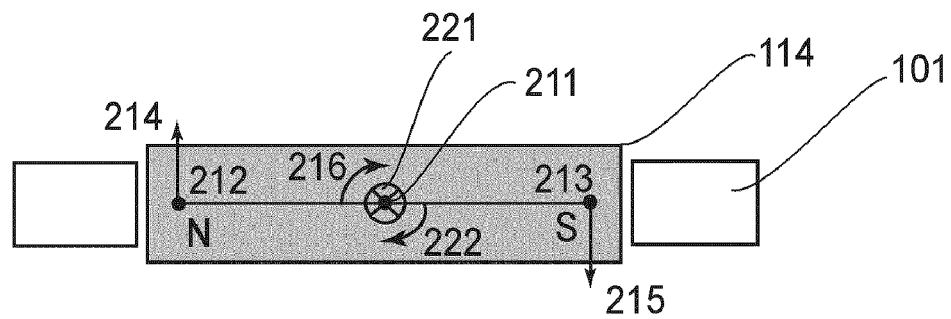
Figure 2B:
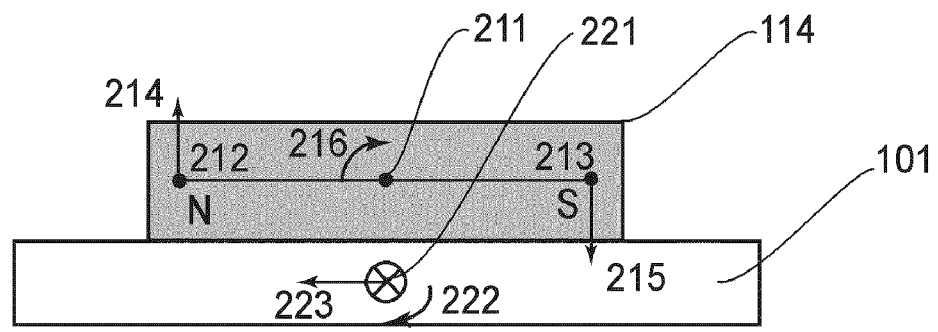
Figure 2B:
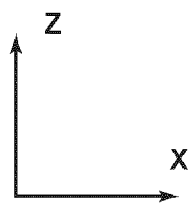

Here, the transverse vibration of the oscillator 101 which is produced when the gravity center of the permanent magnet 114 and the oscillation central axis are not aligned each other, will be explained with reference to FIG. 2A and FIG. 2B. FIG. 2A and FIG. 2B schematically illustrate the oscillator 101 along the A-A' section of FIG. 1A.

FIG. 2A shows the case where the gravity center 211 of the permanent magnet 114 and the oscillation central axis 221 are aligned each other. The present embodiment is based on this. When an even external magnetic field is applied to the oscillator 101, forces 214 and 215 are produced at both poles 212 and 213 of the permanent magnet 114, respectively, and thus a torsional torque 216 about the gravity center 211 is generated. Here, since the gravity center 211 of permanent magnet 114 and the oscillation central axis 221 of the oscillator 101 are aligned, only a torsional torque 222 about the oscillation central axis 221 is applied to the oscillator 101. In this way, the oscillator 101 produces idealistic oscillatory motion about the oscillation central axis 221.

On the other hand, FIG. 2B illustrates a case where the gravity center 211 of the permanent magnet 114 adhered to the surface of the oscillator 101 and the oscillation central axis 221 are not aligned with each other. When an even external magnetic field is applied to the oscillator 101, a torsional torque 216 about the gravity center 211 of the permanent magnet 114 is produced. Here, since the gravity center 211 of the permanent magnet 114 and the oscillation central axis 221 are not aligned, a force 223 in the X-direction is applied to the oscillator 101, in addition to the torsional torque 222 about the oscillation central axis 221. As a result, transverse vibration in the X-direction occurs in the oscillator 101, in addition to the idealistic oscillatory motion about the oscillation central axis 221.

In this embodiment, the permanent magnet 114 is disposed inside the through-hole 113. Therefore, the permanent magnet 114 can be easily disposed to be symmetrical with respect to the oscillation central axis 221. Namely, the permanent magnet 114 is so disposed that the gravity center 124 of the permanent magnet 114 coincides with the oscillation central axis 221 and, by doing it this way, the transverse vibration is suppressed and stable torsional oscillation of the oscillator 101 is assured for a long time.

Referring now to FIGS. 3A-3D, an example of a method of manufacturing the oscillator 101 will be explained.

Figure 3A:
FIGS. 3A-3D are sectional view, respectively, for explaining an example of a method of manufacturing an optical deflector using an oscillator device according to the present invention.

(1) A novolak series resist is applied to the surface of the substrate 111 which is made of monocrystal silicon, with a thickness of around 10 μm, and photolithography is performed, by which a resist mask 115 for dry etching is prepared (FIG. 3A).

Figure 3B:
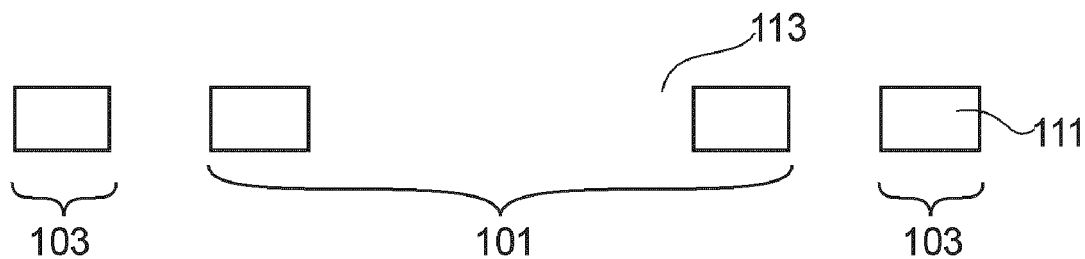

(2) The silicon substrate 111 is then adhered to an adhesion base plate (not shown) and, after that, induction-coupled plasma and RIE based on the BOSCH process are carried out, by which an oscillator 101, torsion spring 102, supporting member 103 and through-hole 113 are formed. Here, the adhesion base plate functions as an etching stopper. Afterwards, the resist mask 115 is removed, and the adhesion base plate is separated (FIG. 3B). Here, the BOSCH process is a method in which an etching gas and a side-wall protecting gas are supplied alternately and, by switching the etching and side-wall protection, the silicon is etched selectively and with good anisotropy. With the use of the RIE process based on this method, the side walls of the oscillator 101 and the through-hole 113 can be formed perpendicularly.

Figure 3C:
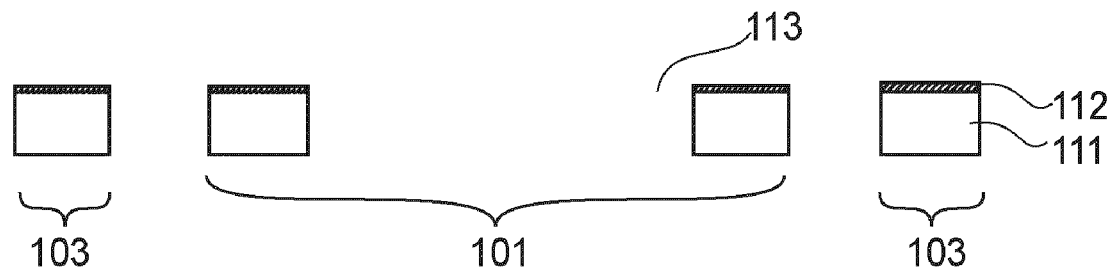

Then, the surface of the substrate 111 is coated with a titanium film of around 50 angstroms and, thereafter, a film of aluminum of around 1000 angstroms is formed thereon by deposition or sputtering, whereby a reflection film 112 is formed (FIG. 3C).

Figure 3D:
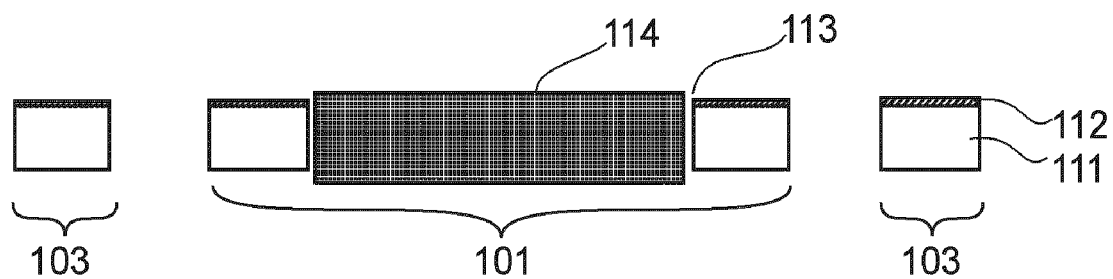

Then, a wire rod of hard magnetic material of a diameter 0.4 mm and a length 1.8 mm is placed inside the through-hole 113, and it is fixed there by use of an adhesive. By magnetizing it, a permanent magnet 114 is provided (FIG. 3D).

Based on the aforementioned manufacturing method using the semiconductor process, high-precision processing is enabled and an oscillator and a torsion spring can be produced very accurately.

In accordance with the present embodiment, since the magnetic member is provided inside a through-hole of the oscillator, the gravity center of the oscillator can be easily put on the oscillation central axis. Therefore, stable oscillation of the oscillator about the oscillation central axis is enabled and stable torsional oscillation is assured for a long time.

Furthermore, in this embodiment, the magnetic member is comprised of a permanent magnet and the magnetic-field generate means is comprised of an electromagnetic coil. Hence, it is not necessary to supply the electric power into the oscillator from the outside, and it is not necessary to provide electric wirings for the supporting member, torsion spring and oscillator. Therefore, the supporting member, torsion spring and oscillator can be made more easily and inexpensively.

Furthermore, in this embodiment, since the sectional shape of the magnetic member is circular, the magnetic member can easily be mounted inside the through-hole. Therefore, the oscillator and magnetic member can be assembled easily and precisely.

Furthermore, in this embodiment, since the thickness (diameter) of the magnetic member is greater than the thickness of the oscillator, even when the magnetic member is within the through-hole, the alignment of both of them can be accomplished easily. Furthermore, the magnetic member can be held down when the same is going to be fixed by adhesive. Therefore, the oscillator and magnetic member can be assembled easily and precisely.

Furthermore, in this embodiment, since the width of one of the openings of the through-hole is made smaller than the width of the magnetic member, the through-hole can have a self-alignment function. Hence, the alignment of the magnetic member can be accomplished more easily and precisely and, therefore, the oscillator and the magnetic member can be assembled more easily and precisely.

Furthermore, in this embodiment, since the supporting member, torsion spring and oscillator are integral and made of silicon, the supporting member, torsion spring and oscillator can be produced based on semiconductor processes. Therefore, the supporting member, torsion spring and oscillator can be manufactured easily and precisely.

Second Embodiment

Figure 4A:
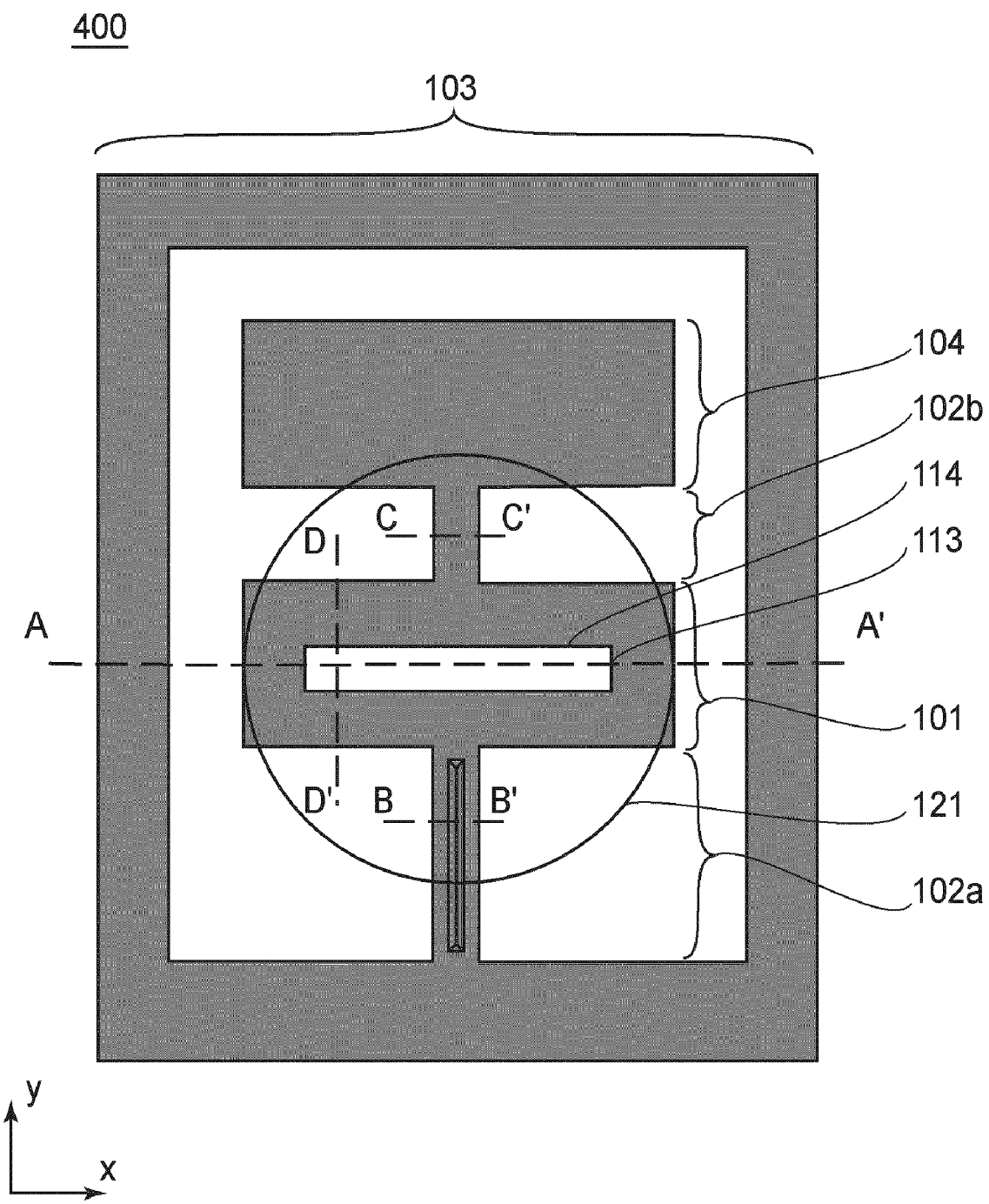
FIG. 4A is a top plan view for explaining a second embodiment of an optical deflector using an oscillator device of the present invention.
Figure 4B:
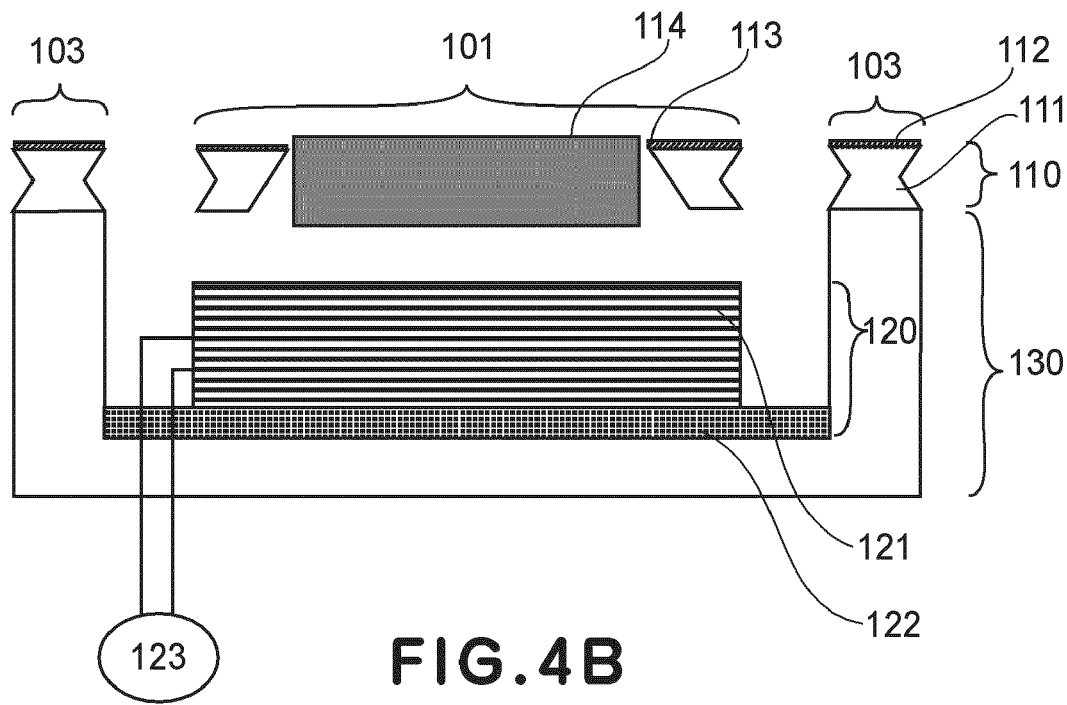
FIG. 4B is a sectional view for explaining the second embodiment.

Next, the structure of an optical deflector 400 according to a second embodiment using an oscillator device of the present invention, will be explained with reference to the drawings. FIG. 4A is a top plan view of the optical deflector. Sectional views taken along a line A-A', a line B-B', a line C-C' and a line D-D' in FIG. 4A are shown in FIG. 4B, FIG. 4C, FIG. 4D and FIG. 4E, respectively. The basic structure, driving method, operational effects are similar to the abovementioned first embodiment. Description of corresponding portions will be omitted here, although they are illustrated in the diagrams.

In this embodiment, the optical deflector 400 comprises an oscillator 101 and a passive oscillator 104. A through-hole 112 and a permanent magnet 114 are formed only in the oscillator 101. More specifically, the oscillator device comprises plural oscillators 101 and 104 and plural torsion springs 102a and 102b, and these oscillators and torsion springs are placed on a straight line along the oscillation central axis. Then, at least one of the plural oscillators 101 and 104 is not provided with a through-hole and a magnetic member. In such a structure, although the passive oscillator 104 does not receive the function of the magnetic field produced by the magnetic coil 121, it oscillates passively in response to the oscillatory motion of the oscillator 101. The passive oscillator 104 has a reflection film 112 the whole of which can be used as a reflection surface. The possibility of contamination or damage of the reflection film 112 during installation of the permanent magnet 114 can be avoided. Therefore, the passive oscillator 104 enables higher-performance operation (e.g., constant angular-speed motion which easily enables constant speed scan of the light beam deflected by the reflection surface formed on that oscillator) as well as stable operation. Furthermore, it enables oscillation of the oscillator 101 and the passive oscillator 104 even at different resonance frequencies.

In this embodiment, the side wall of through-hole 113 intersecting with the oscillation central axis defines an angle of about 54 degrees relative to the substrate 111 surface, and one of the openings of the through-hole 113 is made smaller than the size of the permanent magnet 114. Furthermore, the permanent magnet 114 of cylindrical shape is placed so as to contact the side wall of the through-hole 113 (see FIG. 4B and FIG. 4D). With such shape, the alignment of the permanent magnet 114 during the manufacture can be accomplished more accurately and easily.

Figure 4C:
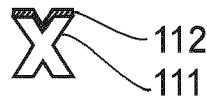
FIG. 4C and FIG. 4D are partial sectional views of a torsion spring, respectively.
Figure 4D:
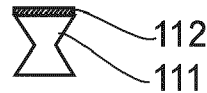
Figure 4E:
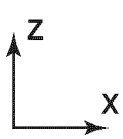
FIG. 4E is a partial sectional view of the magnetic member.
Figure 4E:
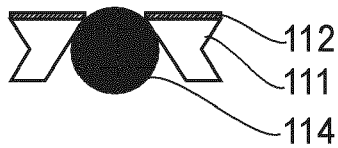

The side walls of the torsion springs 102a and 102b are constituted by combining planes having an angle of about 54 degrees relative to the substrate 111 surface (see FIGS. 4C and 4D). With the provision of such side-wall shape, deformation other than the torsional deformation can be minimized, such that displacement of the oscillator 101 and the passive oscillator 104 due to the self-weight thereof by can be minimized even if the opposite ends of them are not supported.

Next, an example of a method of manufacturing the optical deflector 400 of the present embodiment will be explained with reference to FIGS. 5A-5E.

Figure 5A:
FIGS. 5A-5E are sectional views, respectively, for explaining another example of a method of manufacturing an optical deflector using an oscillator device of the present invention.

(1) A silicon nitride film 116 is formed on both surfaces of a substrate 111 which is made of monocrystal silicon (FIG. 5A).

Figure 5B:

(2) Then, a novolak series resist is applied to the silicon nitride film 116 on the substrate surface with a thickness of around 1 μm and photolithography is performed, by which a resist mask (not shown) is prepared. Afterwards, an RIE process is performed using a fluorine-based gas such as $CF_4$ and the silicon nitride 116 is etched, whereby a silicon nitride mask is formed. The resist mask is then removed. In a similar manner, a silicon nitride mask at the bottom surface is formed (FIG. 5B).

Figure 5C:
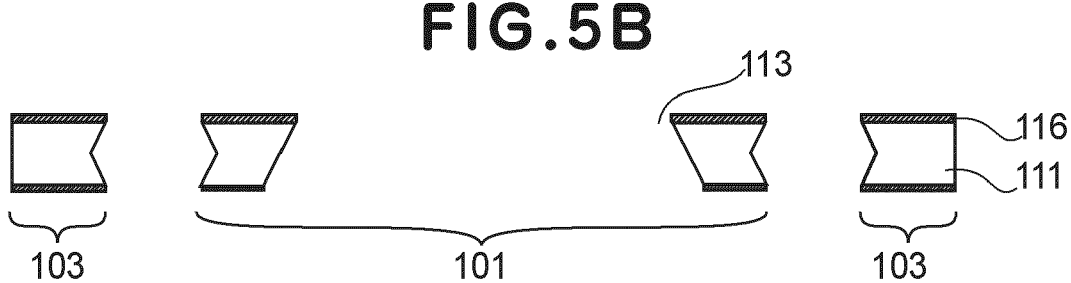

(3) By soaking the substrate 111 in an alkali water solution, anisotropic etching of the substrate 111 is carried out, whereby an oscillator 101, torsion springs 102a and 102b, supporting member 103, passive oscillator 104 and through-hole 113 are formed. In this embodiment, a potassium hydroxide water solution is used. Since the alkali water solution such as potassium hydroxide water solution has a slow etching rate of the (111)-equivalent surface of the monocrystal silicon as compared with the other surface, a shape which is surrounded by (111)-equivalent surfaces can be produced. Based on this feature, in this embodiment, an angle of about 54 degrees is defined between the side wall of the through-hole 113 and the surface of the substrate 101. Hence, the alignment of the permanent magnet 114 can be accomplished more easily and accurately. Furthermore, based on similar features, the side-wall shape of the torsion springs 102a and 102b can be made (FIG. 5C).

Figure 5D:
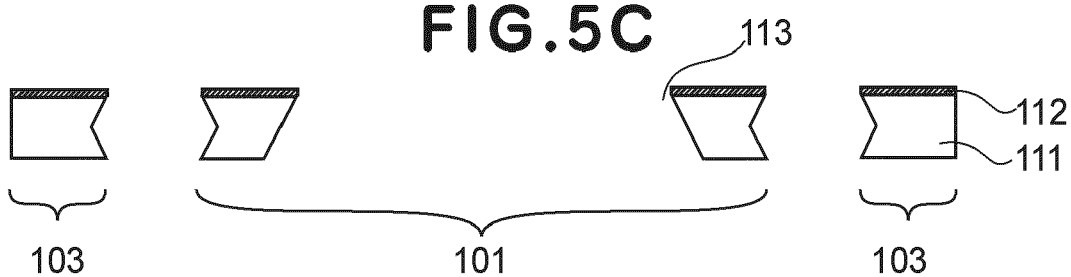

(4) The silicon nitride 116 is removed by RIE using a fluorine-based gas such as $CF_4$. Subsequently, the surface of the substrate 111 is coated with a titanium film of around 50 angstroms and, thereafter, a film of aluminum of around 1000 angstroms is formed thereon by deposition or sputtering, for example, whereby a reflection film 112 is formed (FIG. 5D).

Figure 5E:
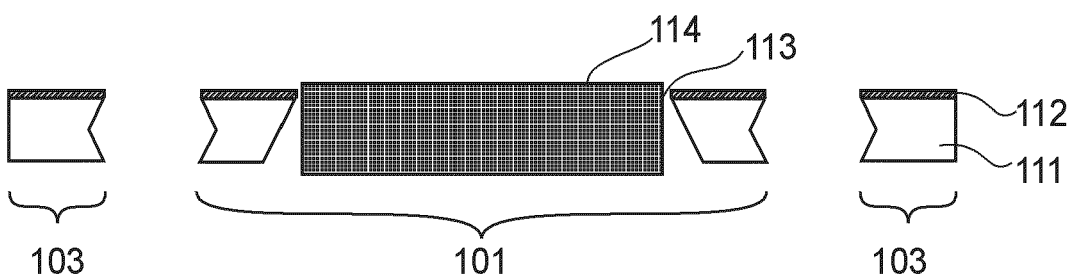

(5) Then, a wire rod of hard magnetic material of a diameter 0.4 mm to 0.5 mm and a length 1.8 mm is placed inside the through-hole 113, and it is fixed there by use of an adhesive. By magnetizing it, a permanent magnet 114 is provided (FIG. 5E).

In accordance with the present embodiment as well, since the magnetic member is provided inside a through-hole of the oscillator, the gravity center of the oscillator can be easily aligned with the oscillation central axis. Therefore, stable oscillation of the oscillator about the oscillation central axis is enabled, such that stable torsional oscillation is assured for a long time.

Furthermore, in this embodiment, plural oscillators and plural torsion springs are provided, and these oscillators and torsion springs are placed on a straight line along the oscillation central axis. With this arrangement, plural oscillators can be driven at the same time and, thus, a new function can be added to the oscillator. Hence, the oscillator can have higher performance, such that a higher-performance oscillator device is accomplished.

Furthermore, in this embodiment, a passive oscillator connected to the torsion spring is provided. This passive oscillator does not have a through-hole and a magnetic member. With this arrangement, the passive oscillator can be free from any constraint will otherwise be loaded as a result of the provision of the through-hole and the magnetic member. Thus, the functional degree of freedom to be added to the passive oscillator is widened, and the passive oscillator can have a higher performance. Hence, a higher-performance oscillator device is accomplished.

Third Embodiment

Figure 6A:
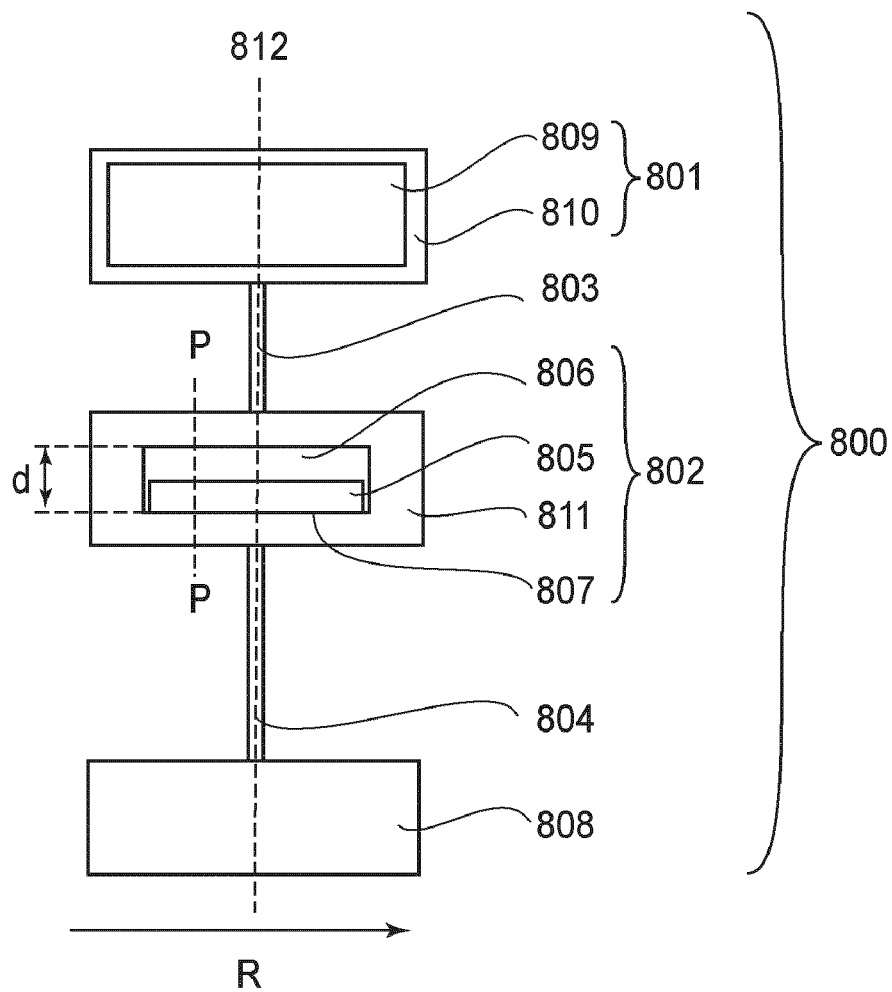
FIG. 6A is a top plan view for explaining a third embodiment of an optical deflector using an oscillator device of the present invention.
Figure 6B:
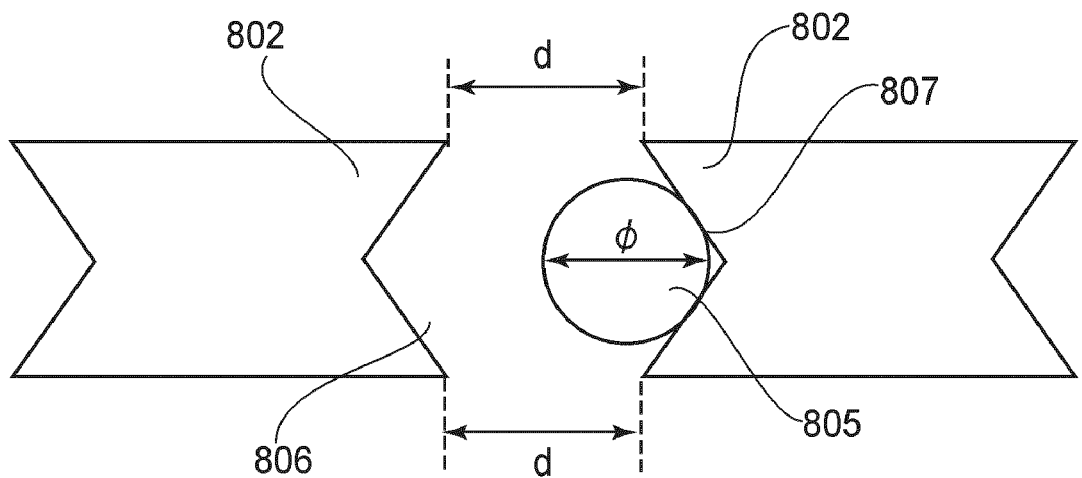
FIG. 6B is a sectional view for explaining the third embodiment.

The structure of an optical deflector 800 according to a third embodiment using an oscillator device of the present invention, will be explained with reference to the drawings. FIG. 6A is a top plan view of the optical deflector. A sectional view taken along a plane extending along a line P-P in FIG. 6A and being perpendicular to the sheet of the drawing is shown in FIG. 6B. The basic structure and driving method are similar to the abovementioned second embodiment. In FIG. 6A, denoted at 801 is a first oscillator, and denoted at 802 is a second oscillator. Denoted at 803 is a first torsion spring, and denoted at 804 is a second torsion spring. Denoted at 805 is a magnetic member, and denoted at 806 is a through-hole. Denoted at 807 is a magnetic member setting surface, and denoted at 808 is a supporting member. Denoted at 812 is an oscillation central axis. Like the preceding embodiment, the through-hole 806 extends through the oscillator, from its top surface to its bottom surface.

In the optical deflector 800 of the present embodiment, the first oscillator 801 is supported by the second oscillator 802 through the first torsion spring 803. Furthermore, the second oscillator 802 is supported by the supporting member 808 through the second torsion spring 804.

The first oscillator 801 is comprised of a reflection surface 809 and a silicon member 810. The second oscillator 802 is comprised of a silicon member 811, a magnetic member 805, a magnetic member setting surface 807 and a through-hole 806. The magnetic member 805 has been polarized in the magnetization direction R. The magnetic member 805 is fixed to the magnetic member setting surface 807 by an adhesive. Here, since the opening width d of the through-hole 806 is made larger than the diameter ø of the magnetic member 805, the magnetic member 805 can be put into the through-hole 806 in the direction perpendicular to the sheet of the drawing of FIG. 6A.

Next, a method of manufacturing the optical deflector 800 of the present embodiment will be explained. The processes except the process of making the through-hole 806 are the same as the manufacturing method of the optical deflector 400 of the second embodiment. FIGS. 7A-7E show the outline of the processes related to each portion of the through-hole 806 of FIG. 6B.

Figure 7A:
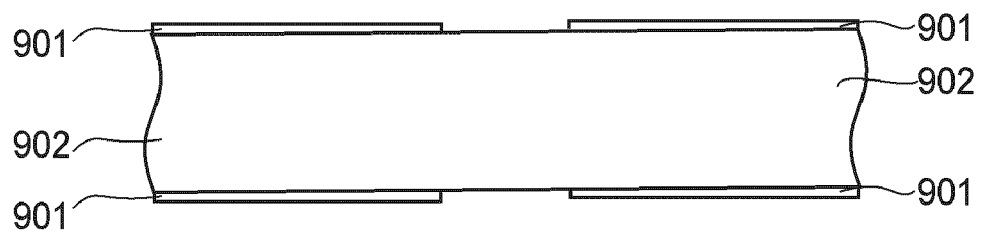
FIGS. 7A-7E are sectional views, respectively, for explaining another example of a method of manufacturing an optical deflector using an oscillator device of the present invention.

First of all, as shown in FIG. 7A, both sides of a tabular silicon substrate 902 having a masking layer 901 of silicon nitride formed thereon are patterned in accordance with the opening contour of the through-hole 806. This patterning is carried out based on an ordinary photolithography process and a dry etching process using a silicon-nitride eroding gas such as $CF_4$, for example.

Figure 7B:
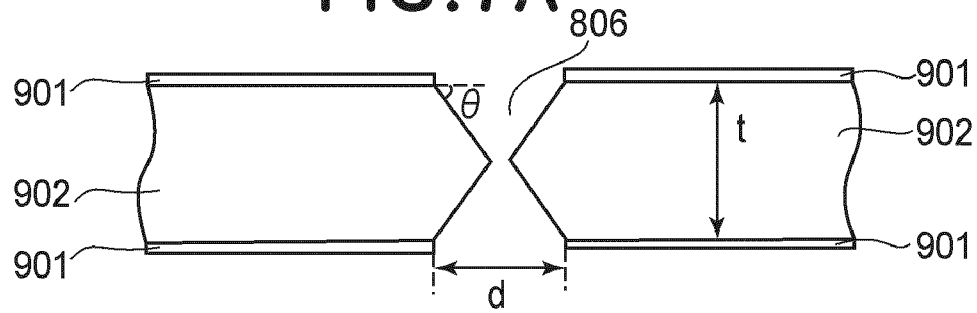
Figure 7C:
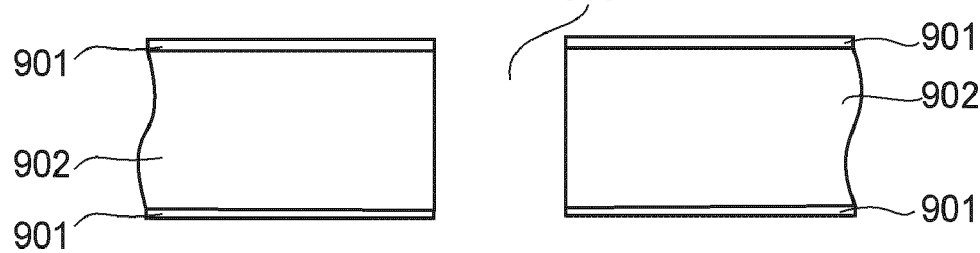
Figure 7D:
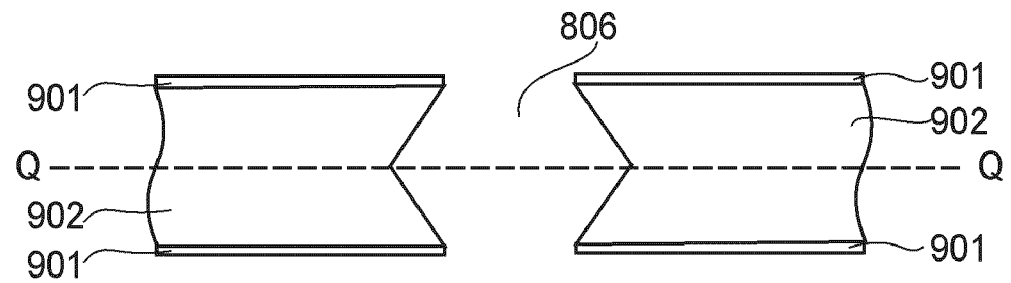

Subsequently, as shown in FIGS. 7B-7D, an anisotropic etching process is performed, whereby a penetrating portion 806 is formed. In the anisotropic etching, the etching rate is faster with regard to the (100)-equivalent surface, whereas it is slower with regard to the (111)-equivalent surface. Therefore, based on the relationship of the pattern of the mask layer 901 and the crystal plane of silicon, a shape surrounded by the (100)-equivalent surface and (111)-equivalent surface, covered by the masking layer 901, can be produced precisely. Then, as shown in FIG. 7D, the side wall which intersects with the oscillation central axis 812 reaches the (111)-equivalent surface, and the etching stops. As a result, a magnetic member setting surface 807 which is recessed symmetrically with respect to a line Q-Q' (namely, being symmetrical with respect to a plane including the oscillation central axis and parallel to the surface of the oscillator) is formed. Here, as shown in FIG. 9B, the (111)-equivalent surface has an angular relationship of 54.7 degrees with the (100)-equivalent surface. Therefore, in order to provide the through-hole 806, the opening width d and the thickness t of the silicon substrate satisfy a relationship of inequality of d*tan 54.7°>t.

Here, after the aforementioned anisotropic etching, an isotropic etching process may be carried out by using a gas or acid to round the corners of the torsion springs 803 and 804. In that occasion, stress concentration to these portions can be reduced. Here, the corners of the magnetic member setting surface 807 as well are rounded. If the radius of the corner is denoted by R, in order that the magnetic member 805 having a diameter ø is mounted precisely on the magnetic member setting surface 807, a relationship ø>2R should be satisfied.

Figure 7E:
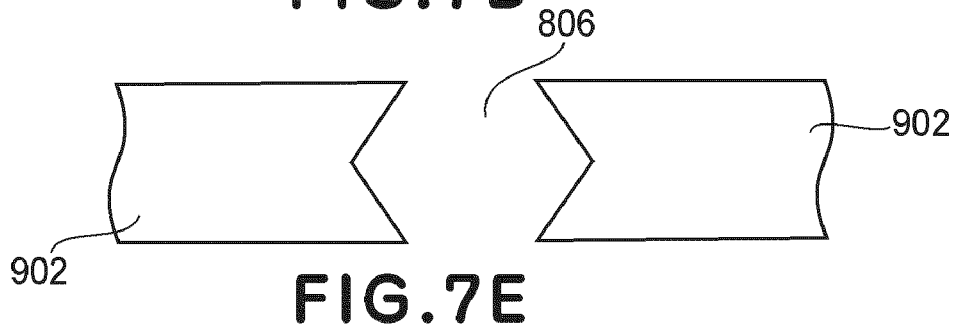

Finally, as shown in FIG. 7E, the masking layer 901 of the silicon nitride is removed.

With the method of making the through-hole 806 as described above, since the shape of the through-hole 806 is determined by the monocrystal silicon (111)-equivalent surface, the shape can be processed very accurately. Furthermore, as shown in FIG. 7D, the magnetic member setting surface 807 has a recessed shape which is symmetrical with respect to the line Q-Q, and the cross-sectional shape of the magnetic member 805 is circular as shown in FIG. 6B. Therefore, even if manufacturing dispersion occurs in the diameter ø of the magnetic member 805, the magnetic member 805 can be fixed precisely on the magnetic member setting surface 807, such that the gravity center of oscillator 802 and the oscillation central axis can be easily aligned each other.

Fourth Embodiment

Figure 8A:
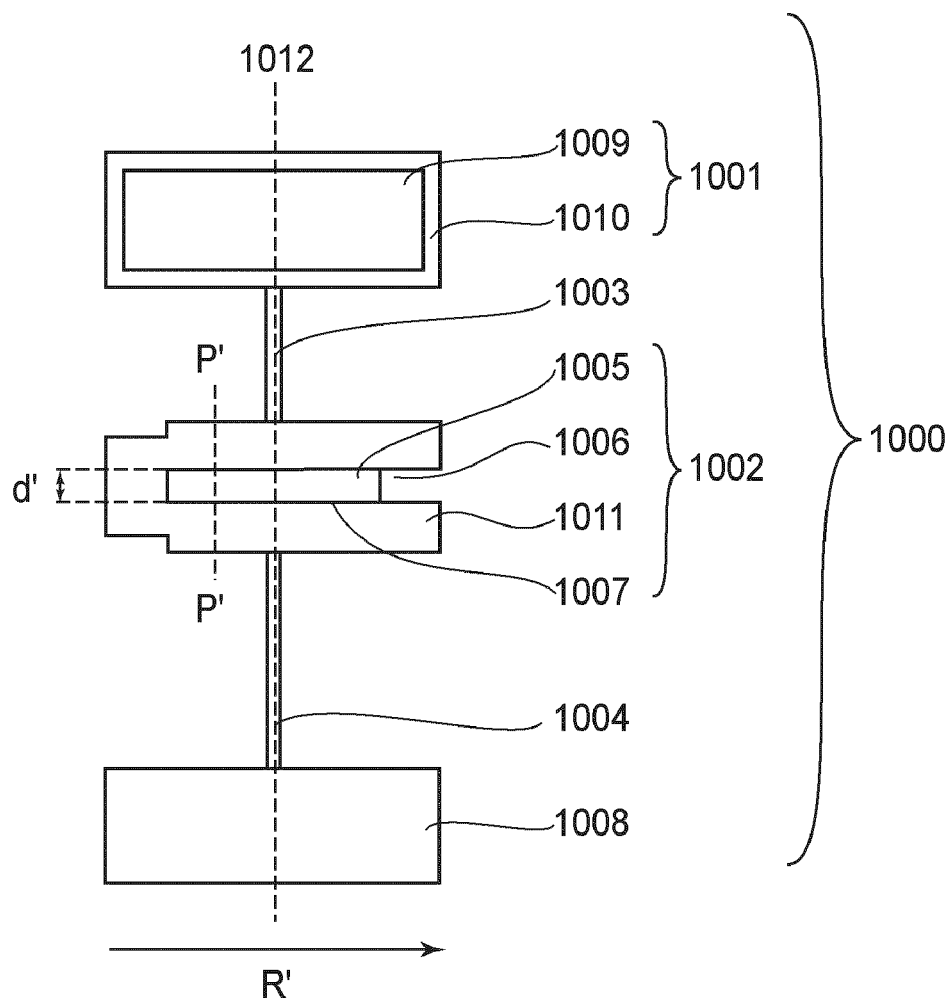
FIG. 8A is a top plan view for explaining a fourth embodiment of an optical deflector using an oscillator device according to the present invention.
Figure 8B:
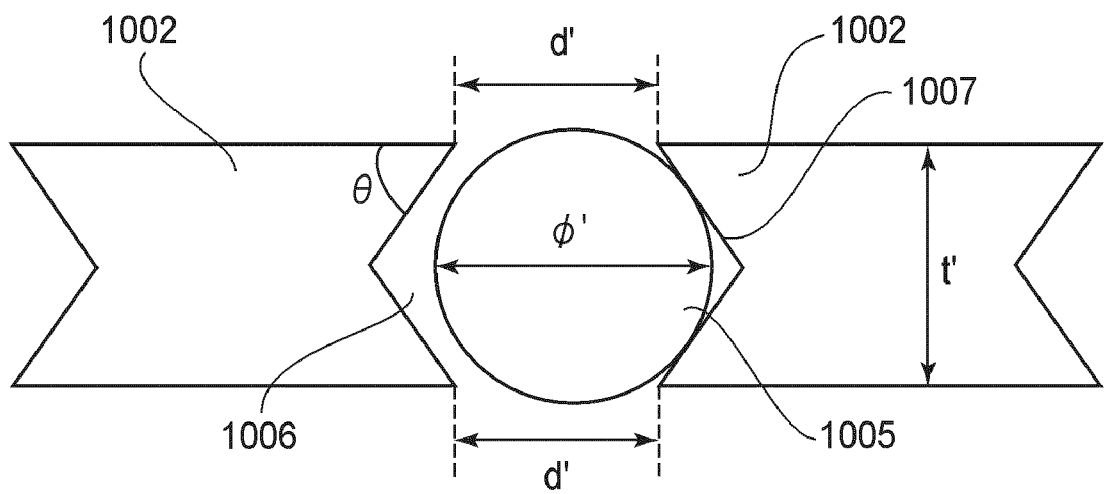
FIG. 8B is a sectional view for explaining the fourth embodiment.

The structure of an optical deflector 1000 according to a fourth embodiment using an oscillator device of the present invention, will be explained with reference to the drawings. FIG. 8A is a top plan view of the optical deflector. A sectional view taken along a plane extending along a line P'-P' in FIG. 8A and being perpendicular to the sheet of the drawing is shown in FIG. 8B. The basic structure and driving method are similar to the abovementioned second embodiment. In FIGS. 8A and 8B, denoted at 1001 is a first oscillator, and denoted at 1002 is a second oscillator. Denoted at 1003 is a first torsion spring, and denoted at 1004 is a second torsion spring. Denoted at 1008 is a supporting member, and denoted at 1012 is an oscillation central axis.

In the optical deflector 1000 of the present embodiment as well, the first oscillator 1001 is supported by the second oscillator 1002 through the first torsion spring 1003. Furthermore, the second oscillator 1002 is supported by the supporting member 1008 through the second torsion spring 1004. The first oscillator 1001 is comprised of a reflection surface 1009 and a silicon member 1010. The second oscillator 1002 is comprised of a silicon member 1011, a magnetic member 1005, a magnetic member setting surface 1007 and a space or through-hole 1006. As shown in FIG. 8A, the silicon member 1011 has a channel-shape and it is formed into a shape by which the oscillation central axis 1012 and the gravity center of the second oscillator 1002 is brought into alignment each other. More specifically, the through-hole 1006 of the present embodiment opens outwardly at one place on the side surface of the oscillator. Furthermore, as shown in FIG. 8A, the silicon member 1011 has notches at upper and lower left corners thereof. The magnetic member 1005 has been polarized in the magnetization direction R'. The magnetic member 1005 is fixed to the magnetic member setting surface 1007 by an adhesive.

In this embodiment, since the second oscillator 1002 is formed with a space 1006 which is surrounded at upper and lower portions and except one end portion by the silicon member 1011, the magnetic member 1005 can be put into the space 1006 in a direction parallel to the sheet of FIG. 8A (from the right in FIG. 8A). Therefore, the diameter ø' of the magnetic member 1005 can be made larger than the opening width d' of the through-hole 1006. However, the diameter ø' becomes maximum when the magnetic member 1005 of cylindrical shape is disposed while being in contact with the edge of the through-hole 1006. The diameter ø' of the magnetic member 1005 cannot be enlarged more than it. Thus, an inequality of ø'<t' cos 54.7°+d' sin 54.7° (t' is the thickness of the oscillator 1002) should be satisfied. As described, the magnetic member 1005 can be made large and the torque acting on the magnetic member 1005 when an electric current is applied to an electromagnetic coil (not shown) can be made large. Thus, the oscillator 1002 can be oscillated with low power consumption.

Fifth Embodiment

Figure 9:
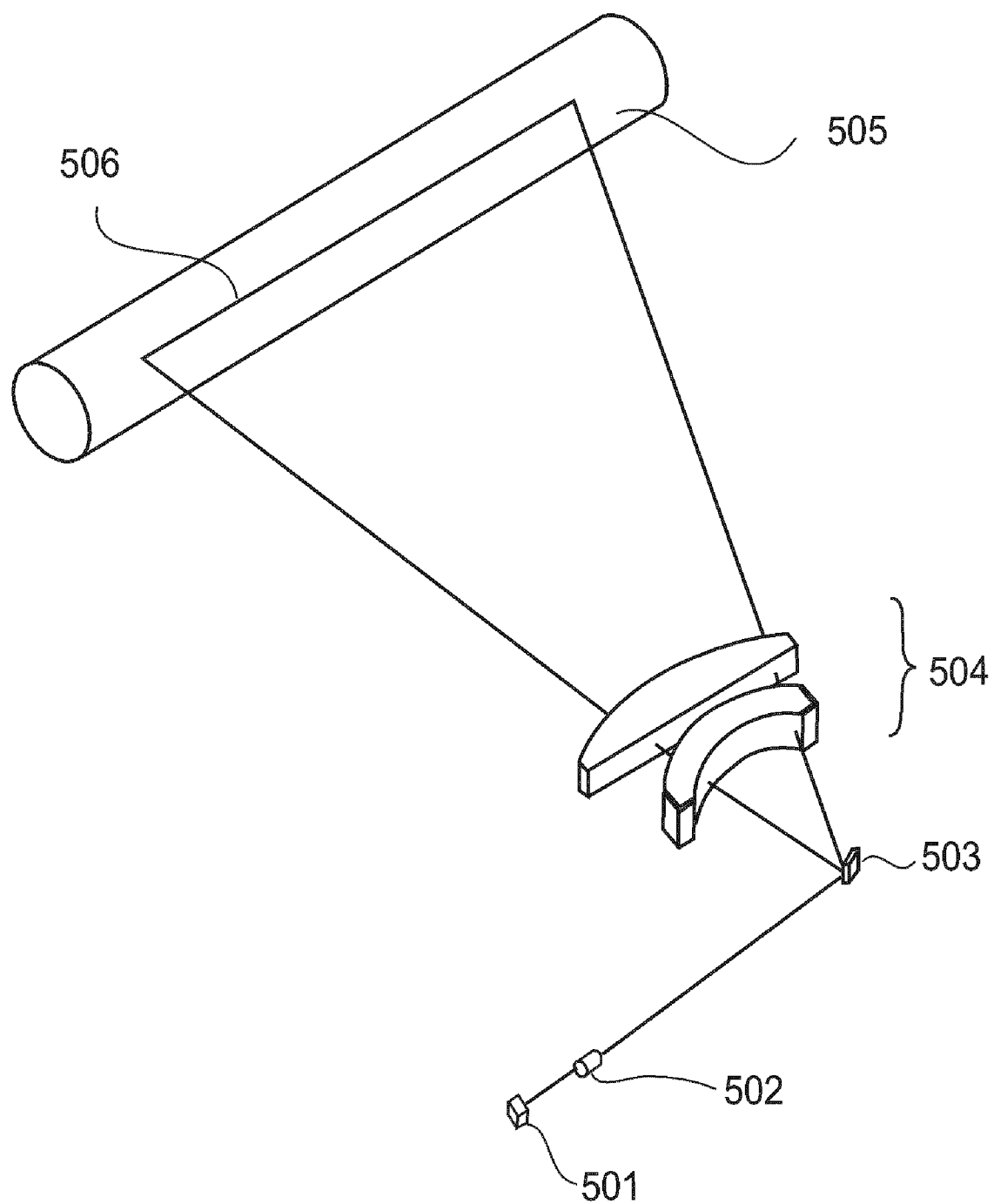
FIG. 9 is a diagram for explaining an optical instrument according to a fifth embodiment of the present invention.
Figure 10:
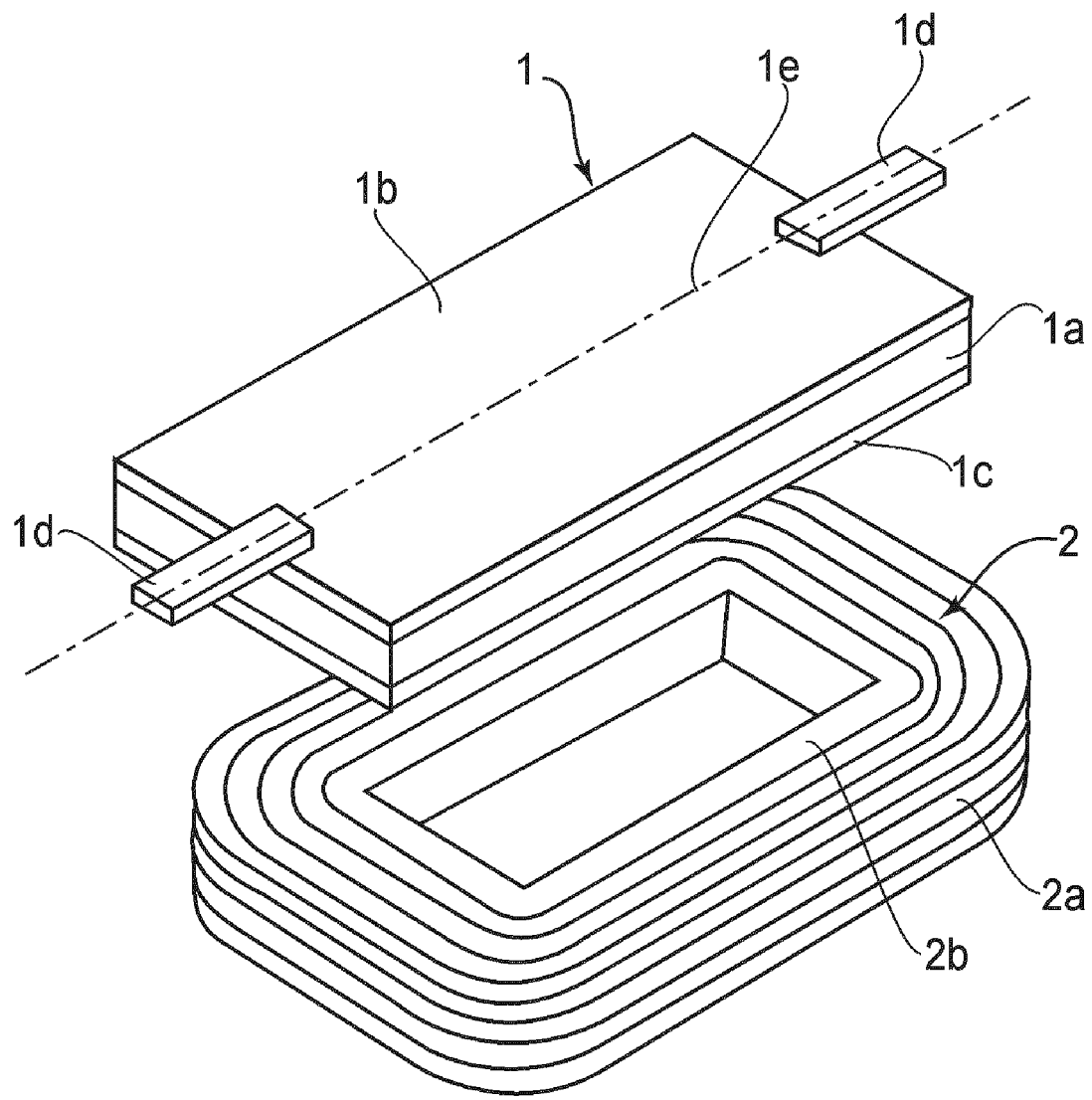
FIG. 10 is a diagram for explaining the background art of the present invention.

FIG. 9 is a diagram showing an embodiment of an optical instrument using an optical deflector based on an oscillator device of the present invention. Here, an image forming apparatus is shown as the optical instrument. In FIG. 9, denoted at 503 is the optical deflector of the present invention which is arranged, in the present embodiment, to scanningly deflect an incident light beam one-dimensionally. Denoted at 501 is a laser source. Denoted at 502 is a lens or lens group. Denoted at 504 is a writing lens or lens group. Denoted at 505 is a photosensitive member which is the target on which the light beam should be incident. Denoted at 506 is a scan locus.

The laser beam projected from the laser source 501 undergoes predetermined intensity modulation related to the timing of the scanning deflection of the light, and then it is scanningly deflected one-dimensionally by the optical deflector 503. By the function of the writing lens 504, the thus scanned laser beam forms an image on the photosensitive member 505 which is rotating at a constant speed around the rotational center. The photosensitive member 505 is uniformly electrically charged by a charging device (not shown). Thus, when it is scanned with light, an electrostatic latent image is formed on the scanned portion. Subsequently, a toner image is formed on the image portion of the electrostatic latent image by means of a developing device (not shown). This toner image is transferred to a paper sheet (not shown) and fixed thereon, by which an image is produced on the paper sheet.

With the optical deflector of the present invention, the angular speed of the scanning deflection of the light can be made approximately constant angular speed within a specified range. Furthermore, with the use of the optical deflector of the present invention having a reflecting member formed at the oscillator, stable scanning operation is assured for a long time. Thus, with the use of a structure including a light source and an optical deflector for deflecting light from the light source and by projecting at least a portion of light, deflected by the optical deflector, onto an image forming member, stable image formation is assured for a long time.

An optical deflector which is comprised of an oscillator device of the present invention can be incorporated into a visual display unit. In that occasion, the optical deflector deflects the light from a light source and directs at least a portion of the light onto an image display member which is the target on which the light should be incident.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-204850 filed Aug. 7, 2007, for which is hereby incorporated by reference.

What is claimed is:

1. An oscillator device, comprising:
   an oscillator;
   a resilient support member configured to support said oscillator for oscillatory motion about an oscillation central axis;
   a magnetic member; and
   a magnetic-field generating member disposed opposed to said oscillator;
   wherein said oscillator has a through-hole extending through said oscillator from its top surface to its bottom surface, and
   wherein said magnetic member is provided in the through-hole, and said magnetic member has a gravity center through which the oscillation central axis of said oscillator passes.

2. An oscillator device according to claim 1, wherein the through-hole opens outside, at one location on a side surface of said oscillator.

3. An oscillator device according to claim 1, wherein the through-hole has a recess formed in its side wall, wherein the recess is symmetric with respect to a plane which contains the oscillation central axis and which is parallel to the surface of said oscillator, and wherein said magnetic member is provided at the recess.

4. An oscillator device according to claim 1, wherein the through-hole extends in a direction intersecting with the oscillation central axis.

5. An oscillator device according to claim 1, further comprising a plurality of oscillators and a plurality of torsion springs, wherein said plurality of oscillators and said plurality of torsion springs are disposed on a straight line extending along the oscillation central axis.

6. An oscillator device according to claim 5, wherein at least one of said plurality of oscillators does not have the through-hole and said magnetic member.

7. An oscillator device according to claim 1, wherein said magnetic member has a cylindrical shape.

8. An oscillator device according to claim 1, wherein said magnetic member has a thickness larger than a thickness of said oscillator.

9. An oscillator device according to claim 1, wherein said oscillator is made of silicon monocrystal.

10. An oscillator device according to claim 9, wherein the side wall of said through-hole is constituted by a (111)-equivalent surface of the crystal surface of the silicon monocrystal.

11. An oscillator device according to claim 10, wherein lengths of openings formed at the top surface and the bottom surface of said oscillator, respectively, in a direction parallel to the oscillation central axis, are equal to each other, and wherein, when the length of the two openings is denoted by d and the thickness of said oscillator is denoted by t, an inequality $d \times \tan(54.7°) > t$ is satisfied.

12. An oscillator device according to claim 1, wherein one of lengths of openings formed at the top surface and the bottom surface of said oscillator, respectively, in a direction parallel to the oscillation central axis is shorter than the other length.

13. An oscillator device according to claim 1, wherein said magnetic member is comprised of a permanent magnet, and wherein said magnetic-field generating member is comprised of an electromagnetic coil.

14. An optical deflector, comprising:
    an oscillator device as recited in claim 1; and
    a light reflecting member provided on one oscillator.

15. An optical instrument, comprising:
    a light source;
    an optical deflector as recited in claim 14; and
    a target member on which light is to be incident;
    wherein said optical deflector is configured to deflect light from said light source and to project at least a portion of the light onto said target member.

16. In a method of manufacturing an oscillator device recited in claim 1, the improvement residing in that a side wall of the through-hole is formed based on an anisotropic etching process.

* * * * *